July 6, 1937.  R. F. PEO ET AL  2,086,236
VALVING ASSEMBLY FOR HYDRAULIC SHOCK ABSORBERS
Filed Jan. 17, 1936  4 Sheets-Sheet 1

Inventors
Ralph F. Peo.
Carl F. Lautz.
Gervase M. Magrum.
by Charles C. Hills Attys.

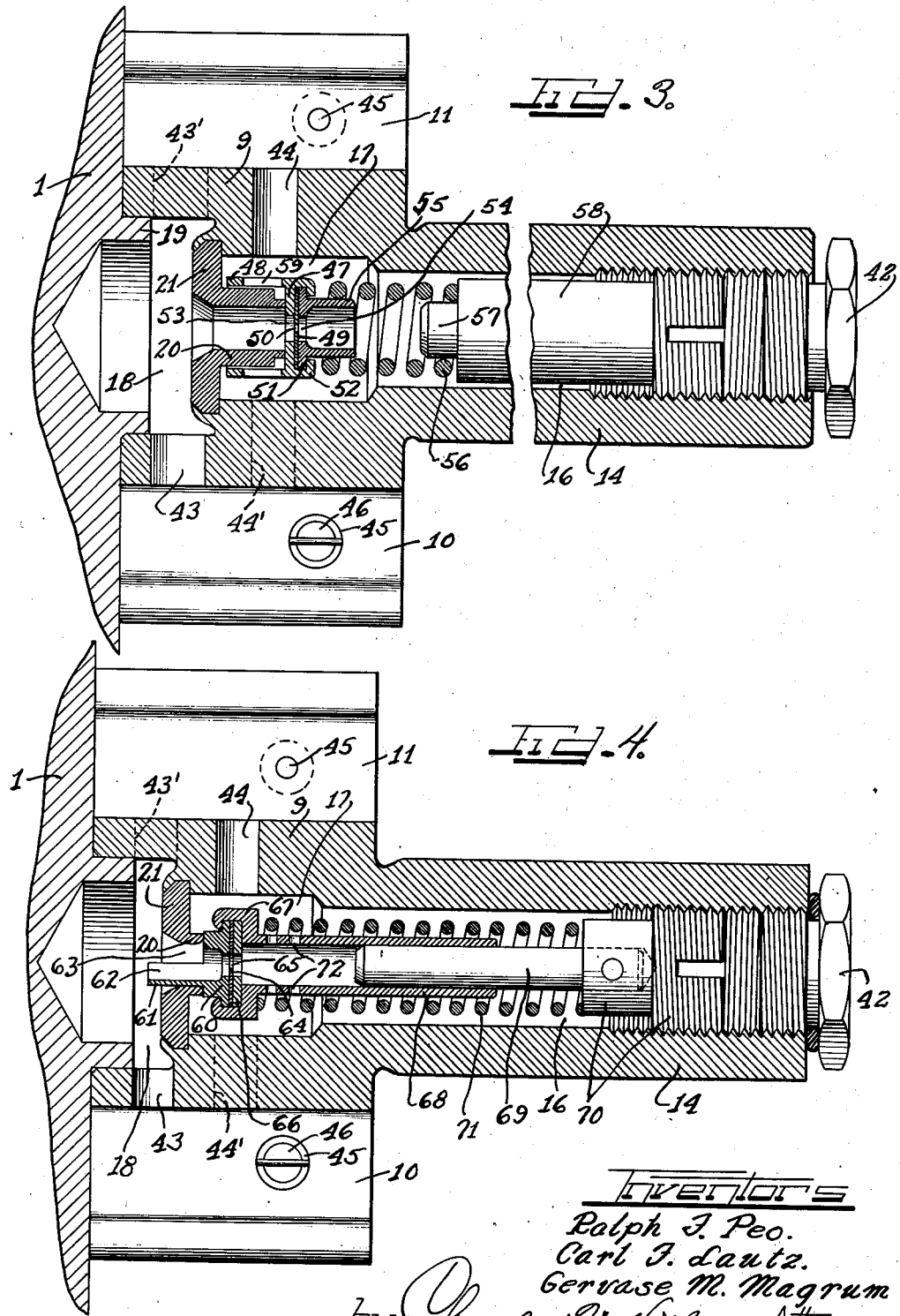

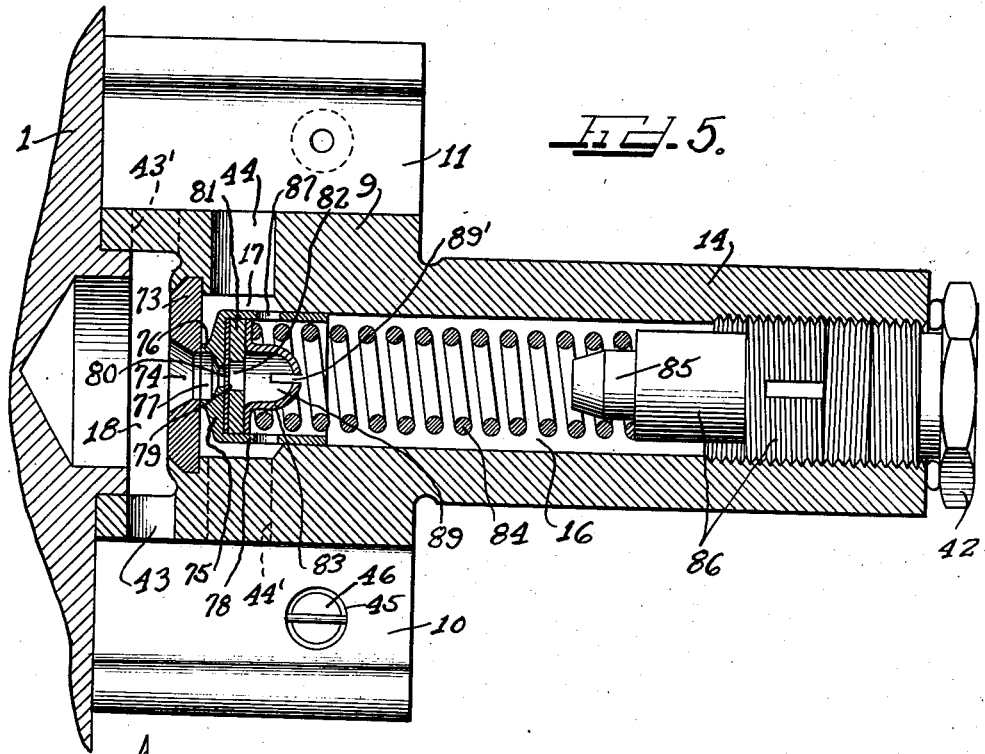
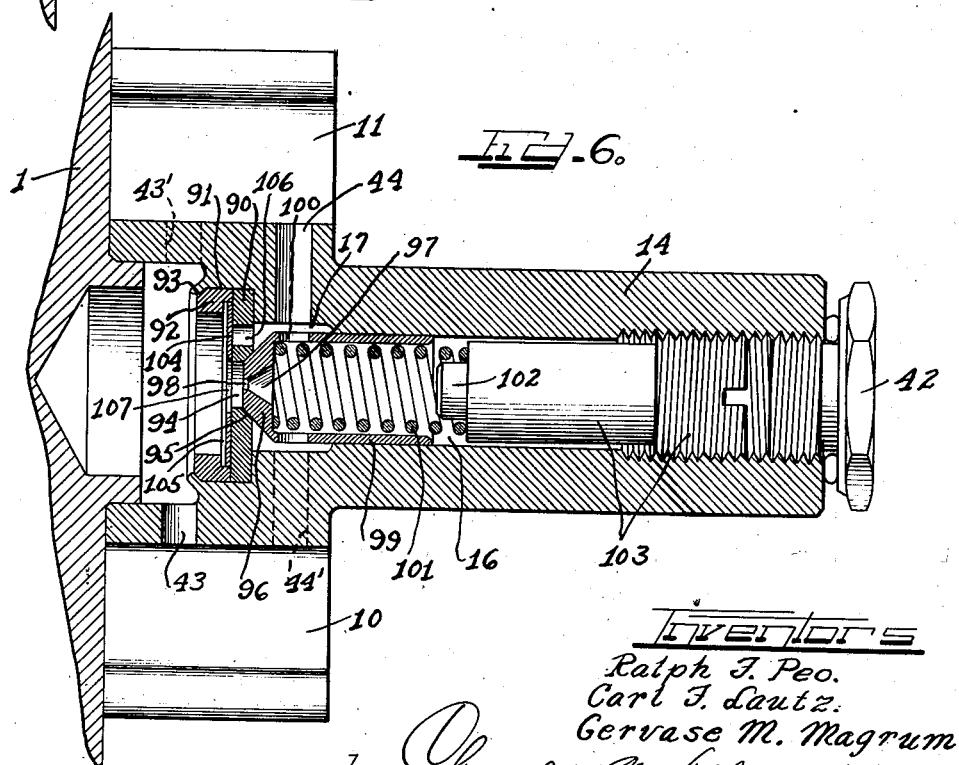

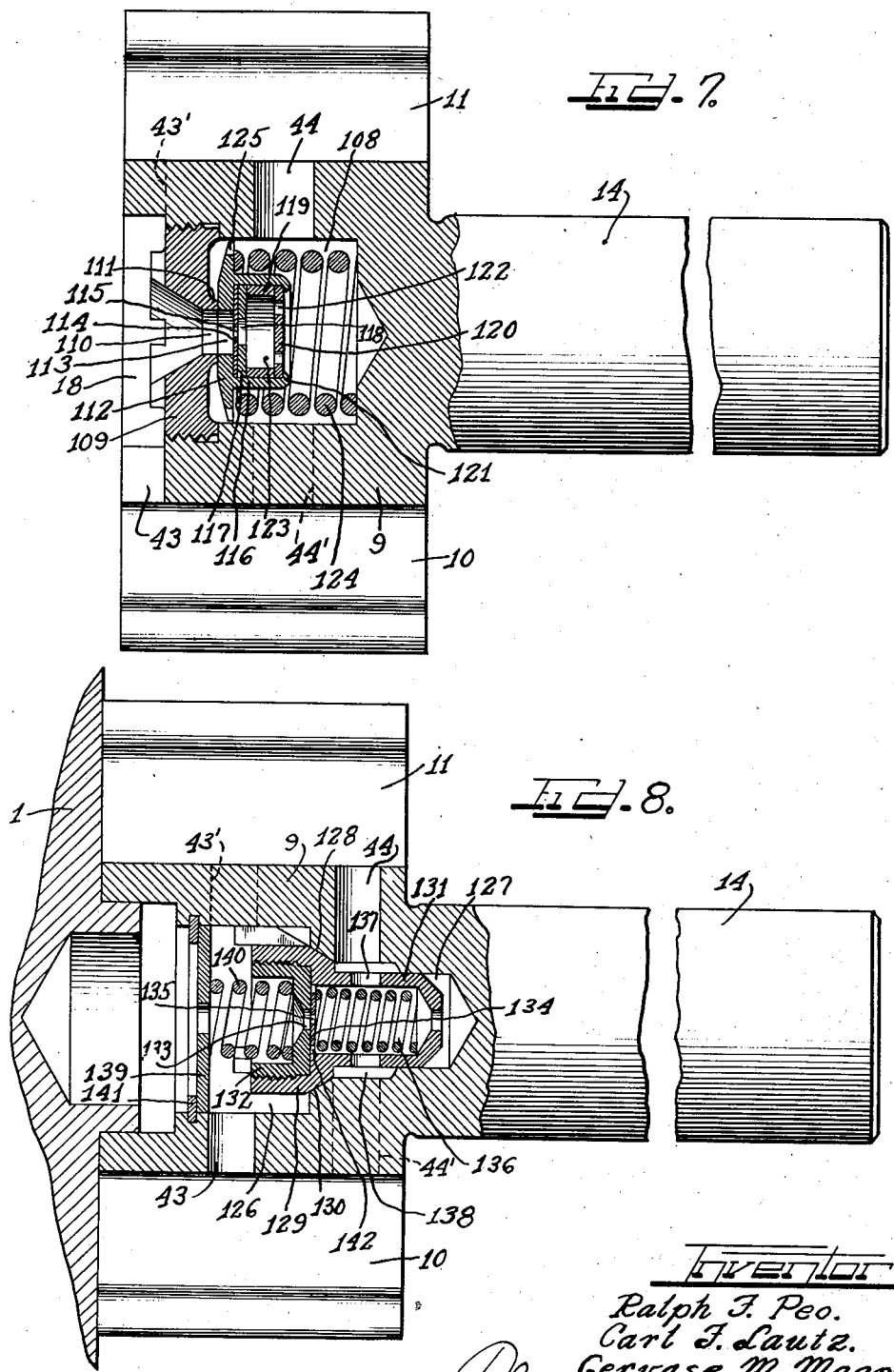

Patented July 6, 1937

2,086,236

UNITED STATES PATENT OFFICE 2,086,236

VALVING ASSEMBLY FOR HYDRAULIC SHOCK ABSORBERS

Ralph F. Peo, Carl F. Lautz, and Gervase M. Magrum, Buffalo, N. Y., assignors to Houde Engineering Corporation, Buffalo, N. Y., a corporation of New York Application January 17, 1936, Serial No. 59,502

11 Claims. (Cl. 188—100)

This invention relates to valving structure and assembly which is particularly adaptable and serviceable for controlling the displaced hydraulic fluid flow in hydraulic shock absorbers on automotive vehicles.

The main object of the invention is to provide a valving assembly for efficiently controlling the fluid flow during rebound movement of the vehicle springs and with the valving assembly comprising a short restricted orifice which will meter the hydraulic flow substantially independently of viscosity change in the fluid, and a safety or blow-off valve movable by abnormal or excessive pressure to provide additional passageway so that the shock absorber and the connecting levers, links and fittings, as well as the frame of the car will not be subjected to abnormal stress and strain when abnormal road conditions are encountered, adjustment being preferably provided so that the blow-off valve will not function until a predetermined abnormal pressure is reached and then only momentarily until normal pressure conditions have been reestablished.

More in detail, our present development involves an arrangement in which the blow-off valve is normally seated in closed position under yielding pressure of a spring but a short restricted orifice passage is provided through the blow-off valve structure for metering the displaced fluid flow during normal operation of the shock absorber, the blow-off valve being opened only when predetermined excessive pressure is reached in order to provide increased passageway for the fluid to thereby relieve the abnormal pressure.

The various features of the invention are incorporated in the structure disclosed on the accompanying drawings, in which drawings Figure 1 is a plan view of a hydraulic shock absorber with a portion of the cover removed;

Figures 3 to 8 are views similar to Figure 2 but showing modified valving arrangement.

Figure 1:
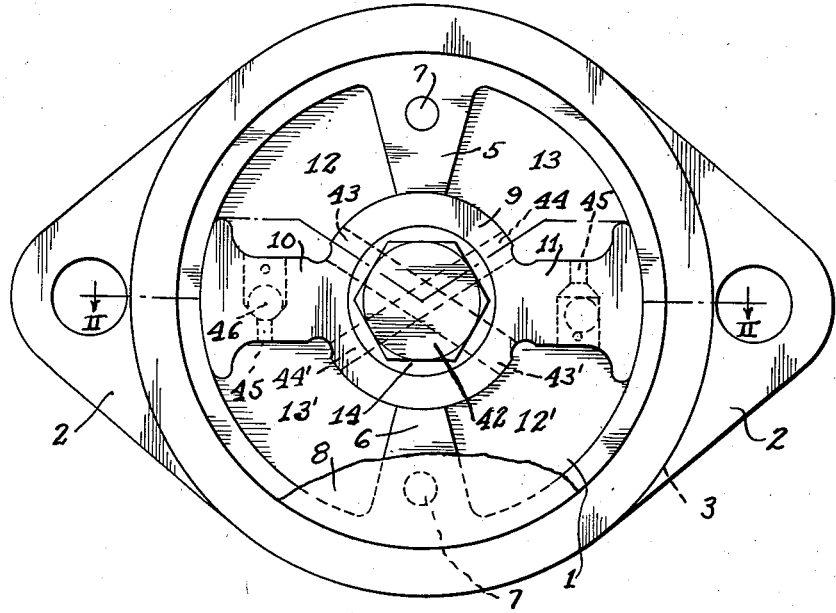

The shock absorber to which we have shown the valving assemblies applied is of the so-called rotary type. Briefly describing the structure it comprises a base 1 having ears 2 for securing it to a support as for example the chassis of an automobile. The annular wall 3 extends from the base and within this wall is the ring 4 from which extends the abutment partitions 5 and 6, this ring structure being secured by pins 7 extending through the abutment partitions and into the base 1. The outer end of the annular wall 3 is closed by a cover structure 8 which may be secured by threaded engagement with the wall 3.

Within the ring 4 is the cylindrical piston hub 9 which extends between the abutment partitions 5 and 6 and which has piston vanes 10 and 11 extending therefrom for bearing engagement with the ring, this piston structure together with the partition members dividing the space within the ring and between the base and cover structure 8 into high pressure chambers 12 and 12' and low pressure chambers 13 and 13' from which the oil is displaced as the piston structure oscillates.

A shaft 14 extends from the piston hub 9 and at its outer end is journaled in the cover structure 8 in a well-known manner, the shaft at its outer end having applied thereto a lever 15 (Figure 2) for connection usually with the axle of the vehicle so that during relative movement between the chassis and axle the piston structure will be oscillated for displacement of the hydraulic fluid.

Figure 2:
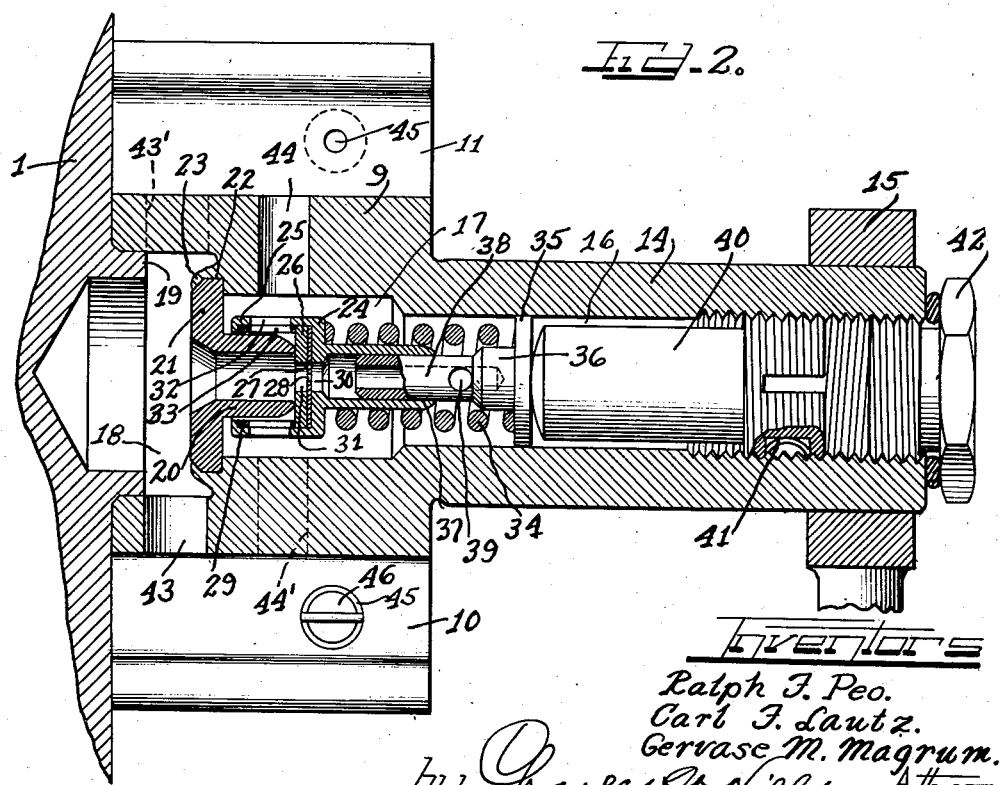
Figure 2 is a section on plane II—II of Figure 1 of the piston structure showing one form of our improved valving arrangement therein.

Referring particularly to Figure 2 the shaft 14 has the cylindrical bore 16 therethrough communicating with an intermediate bore 17 within the hub 9, the inner end of the hub having the cylindrical cavity or bore 18 of larger diameter than the intermediate bore, the bore 18 receiving the bearing and aligning lug 19 on the base 1 for journaling the piston structure at its inner end.

Describing now the valving arrangement disclosed on Figure 2, the intermediate bore 17 in the hub provides a valve chamber. A tubular valve seat member 20 extends coaxially into the inner end of the valve chamber and is supported by its flange 21 which is seated in the recess 22 and securely held in place as by deflection thereagainst of the metal 23 surrounding the recess. The valve element comprises a head 24 having the annular flange 25 extending rearwardly therefrom around the tubular seat 20, and clamped between the head and a washer 26 is a thin metal disk 27 having the centrally located restricted short orifice 28 therethrough. The washer fits into the annular flange 25 and, as shown, a bushing 29 within the flange is held against the washer by crimping or deflecting the outer end of the flange around the end of the bushing.

The valve head 24 and the washer 26 have respectively the passageways 30 and 31 therethrough preferably coaxial with the orifice 28 of the interposed valve disk 27, and the flange 25 and the bushing 29 have registering passageways 32 and 33 respectively therethrough communicating with the valve chamber 17 but closed to the bore of the tubular valve seat 20 when the washer 26 engages with or seats against the outer end of the seat.

The valve element is normally held in seating engagement with the seat element 20 by a spring 34 interposed between the valve head 24 and an abutment head 35 within the shaft bore 16. To keep the spring properly aligned, the abutment head 35 has the cylindrical lug 36 and the valve head 24 has the tubular stem 37, the lug and stem receiving the respective ends of the spring. The lug 36 has the tubular extension or stem 38 which is received by the tubular stem 37 of the valve head and the movement of the valve in axial direction is thus guided by this telescopic engagement between the tubular stems. The bores of these tubular stems or extensions form a space which at its inner end communicates with the valve head passage 30 and at its outer end communicates with the valve chamber through one or more ports 39 in the stem 38 adjacent to the spring aligning lug 36.

To adjust the spring resistance to opening of the valve an abutment plug 40 is provided whose head has threaded engagement with the threaded interior outer end of the shaft 14, the plug abutting the spring abutment head 35. A suitable friction element 41 may be interposed between the plug head and the shaft in order to lock the plug in adjusted position. A closure plug 42 may be provided for the outer end of the shaft bore to protect the adjusting and valving assembly.

Radial passageways 43 and 43' through the piston hub 9 connect the high pressure working chambers 12 and 12' respectively with the recess 18, and radial passageways 44 and 44' through the hub connect the low pressure working chambers 13 and 13' respectively with the valve chamber 17.

Describing now the operation, during rebound movement of the vehicle springs with which the shock absorber is associated, the piston structure will rotate in clockwise direction (Figure 1) and the hydraulic fluid displaced from the high pressure working chambers 12 and 12' will flow through the passageways 43 and 43' into the chamber 18 and through the tubular valve seat 20 and from there through the restricted orifice 28 into the space within the tubular valve stem 37 and tubular abutment stem 38, and from there through the port 39 into the valve chamber and then to the low pressure chambers through the passages 44 and 44'. The restricted orifice 28 will meter this flow and interpose resistance for the desired shock absorber action, and as the orifice is short the resistance to flow will be substantially independent of viscosity change in the hydraulic fluid. During ordinary piston oscillation velocity and hydraulic pressure the entire flow will be through the restricted orifice. However should the velocity and pressure become abnormal or excessive then the spring 34 will yield to the pressure against the valve element 24 and this valve element will be moved from its seat on the seating member 20 and fluid will escape past the valve and through the passages 32—33 in the valve element and to the low pressure working chambers so that such excessive pressure is immediately relieved. The valve element 24 which supports the restricted orifice for normal flow will thus act as blow-off or relief valve structure to open up increased passageway for fluid flow in order to bring the pressure conditions back to normal and thus injury to the shock absorber and its connections with a vehicle will be prevented. The adjustment of the spring is preferably such that the spring will have a normal compression setting to hold the valve closed until a predetermined abnormal pressure is reached.

During compression movement of the vehicle springs less hydraulic resistance is required and therefore the flow metering passages 45 are provided through the piston vanes 10 and 11 which passageways are provided with check valves such as balls 46 which open the passageways for flow from the low pressure working chambers to the high pressure chambers in addition to whatever flow there might be through the orifice 28, during compression movements of the vehicle springs, but the check valves close these passages during rebound movement of the vehicle springs so that all the flow must be through the restricted orifice 28, blow-off movement of the valve 24 during rebound movement of the vehicle springs, being accurately guided by the engagement of its flange 25 with the seat member 20 and the engagement of its tubular stem 37 with the stem 38 of the spring abutment head 35 and the valve will always seat accurately after a blow-off operation.

In the modified arrangement shown on Figure 3, the head 47 of the valve element has the rearwardly extending flange 48 receiving the tubular valve seat 20 and the valve disk 49 having the restricted short orifice 50 is clamped between the valve head and the plate 51, this plate being secured by deflecting around the periphery thereof the end of the annular flange 52 extending forwardly from the valve head. The valve head and plate have the passageways 53 and 54 respectively in alignment with the orifice 50.

Extending forwardly from the plate 51 is the tubular lug 55 forming a guide for the inner end of the spring 56 which abuts against the deflected end of the flange 52, the outer end of the spring being aligned by the lug 57 at the inner end of the adjustment plug 58 threading in the shaft bore 16. The spring tends to hold the blow-off valve structure seated with its head 47 against the outer edge of the seat member 20 and during rebound movement of the vehicle springs the displaced fluid flow is, under normal pressure conditions, entirely through the restricted short orifice 50. Under abnormal pressure conditions in chambers 12 and 12' the spring will yield for unseating of the blow-off valve structure and additional flow around the valve seat and through the ports 59 in the valve flange 48 into the valve chamber 17 and from there to the low pressure working chambers. The blow-off valve structure thus, under normal pressure conditions, presents only the restricted orifice to the hydraulic fluid flow but under abnormal pressure conditions opens at a predetermined pressure to provide additional passageway for the fluid flow so as to safeguard the shock absorber and its connections from injury.

Where the shaft boring and threading is true, the adjusting plug 58 may have direct engagement with the spring, as shown in Figure 3. However, to be more certain that the spring will press against the valve accurately in axial direction, the arrangement shown in Figure 2 is preferable as in this arrangement the abutment head 35 is guided in the shaft bore 16 and will transmit the adjusting pressure of the adjustment lug 40 accurately to the blow-off valve structure.

In the modified arrangement shown in Figure 4 the head 60 of the blow-off valve structure seats against the outer edge of the seat 20 and has the guide extension 61 engaging in the bore of the seat member, the extension having the fluid passage bore 62 and being partially cut away on one side to leave the port 63 for flow of the fluid past the valve seat when the valve is open.

The valve disk 64 with the restricted short orifice 65 is carried by the blow-off valve structure and clamped between the valve head and a disk 66. The valve head and clamping disk are surrounded by and clamped within the flange 67 at the inner end of the tube 68 which forms a tubular stem concentric with the valve head and which receives the guide stem 69 on the adjusting head 70 which has threaded engagement with the shaft bore 16. The spring 71 encircles the stem and abuts respectively against the stem flange 67 and the adjustment plug 70. At its inner end the tubular valve stem has the ports 72 connecting the interior of the stem with the valve chamber 17. During the rebound movement of the vehicle springs the fluid displaced from the high pressure working chambers will flow through the bore 62 of the valve extension and through the restricted orifice 65 into the hollow valve stem 68 and from there through the ports 72 into the valve chamber 17 and then through the passages 44 and 44' to the low pressure working chambers of the shock absorber. When the fluid pressure reaches a predetermined limit the spring will yield and the blow-off valve structures will be shifted outwardly by the pressure to lift the valve head from the seat member 20 for additional flow passageway through the port 63 and around the valve seat. The telescopic engagement of the blow-off valve structure with the valve seat and the guide stem 69 will tend to hold the valve structure in accurate axial alignment for easy and efficient movement thereof.

In the modified arrangement shown in Figure 5 the seat member 73 is in the form of a disk seated in the hub 9 between the valve chamber 17 and the inner chamber 18, the disk having the passage 74 therethrough. The head 75 of the blow-off valve structure has the annular seating lip 76 surrounding the passage 77 and normally seating against the seat member 73 around the passage 74. The valve head has the outwardly extending peripheral cylindrical flange 78 slidable in the shaft bore 16 and forming a guide for the valve. The valve disk 79 with its short restricted orifice 80 is clamped between the valve head and a plate 81 within the guide flange 78 which plate has the passage 82 in alignment with the valve head passage 79 and the restricted orifice. An abutment washer 83 abuts the plate 81 and forms the seat for the inner end of the spring 84 extending into the valve flange 78 to be aligned thereby, the outer end of the spring being aligned by the lug 85 on the adjustment plug 86 which has threaded engagement in the shaft bore 16. The valve flange 78 has passageways 87 therethrough for connecting the interior thereof with the valve chamber 17.

During normal pressure conditions, the fluid displaced during rebound movement of the vehicle springs must flow through the restricted orifice 82 but under abnormal pressure conditions the spring 84 yields and the blow-off valve structure is lifted from its seat 73 to provide additional passageway for the fluid flow until normal pressure conditions are restored. In order to muffle any noise which might occur during flow of the fluid through the restricted orifice, provision is made to gradually dissipate the flow velocity and this may be accomplished by the structure shown in which the spring abutment washer 83 is domed outwardly to provide a primary expansion chamber 89 for receiving the fluid coming through the restricted orifice, the dome wall having a more or less restricted outlet 89' for flow of the fluid from the expansion chamber. The velocity of flow of the fluid after passage through the restricted orifice is thus gradually reduced and noise is prevented.

In the modified arrangement shown in Figure 6 the valve seat member 90 is in the form of a cylindrical plate 90 held seated in the bottom of the hub recess 91 by the annular washer 92 which may be secured as by deflecting over the metal at the edge of the recess as indicated at 93. The seat member has the axial passageway 94 which at its outer end is beveled to provide a valve seat 95. The blow-off valve structure comprises the conical head 96 for seating against the conical seat 95, the valve head having the tapered port 97 therethrough at whose apex is the short restricted orifice 98.

The valve head has the outwardly extending cylindrical flange 99 slidable in the shaft bore 16 to form a guide for the valve head and the flange has passageways 100 connecting the interior thereof with the valve chamber 17. The spring 101 is aligned within the flange 99 and abuts the valve head, the outer end of the spring being aligned by the lug 102 on the adjustment plug 103 having threaded engagement with the interior of the shaft bore.

Under normal pressure conditions the hydraulic fluid displaced in the shock absorber during rebound movement of the vehicle springs will flow from the high pressure working chambers of the shock absorber through the blow-off valve orifice and to the low pressure working chambers, but under abnormal pressure conditions the spring will yield and the blow-off valve will be lifted from its seat to provide additional passageway for fluid flow.

In the preceding structures on Figures 1 to 5 check valve controlled passageways are shown provided in the piston vanes for providing less resistance to the fluid flow from the low pressure working chambers to the high pressure chambers during compression movement of the vehicle springs. In the arrangement shown in Figure 6 a floating disk valve 104 controls the flow in the shock absorber during compression movement of the vehicle springs, the disk being movable axially in the shallow annular recess 105 formed in the end of the washer 92 adjacent the seat member 90. The seat member has a port 106 therethrough communicating with the valve chamber 17 and during flow of the fluid from the high pressure working compartments to the low pressure working compartments under rebound movement of the vehicle springs the valve disk will be held by the fluid pressure against the seat member 90 to close the port 106 so that the fluid flow will be through the central opening 107 of the valve disk and through the restricting orifice 98. During compression movement of the vehicle springs the fluid displaced from the low pressure working chambers will shift the valve disk away from the seat member for exposure of the port 106 and flow of the fluid to the high pressure working compartments, the port or orifice 106 metering such low pressure flow.

Figure 7 shows a modified arrangement in which the entire valving assembly and spring are within the piston hub. Within the hub is the valve chamber 108 communicating through passages 44 and 44' with the low pressure working compartments of the shock absorber. The seat member 109 is interposed between the valve chamber and the chamber 18 which is connected by passages 43 and 43' with the high pressure working compartments, the seat member having detachable threaded engagement with the hub and having the axial passageway 110 therethrough surrounded at its outer end by the annular seat lip or flange 111. The head 112 of the blow-off valve structure is of a diameter to fit the cylindrical wall of the valve chamber 108 so as to be guided thereby on its movement toward and away from the seat flange 111. The valve head has the passage 113 therethrough in alignment with the feed passage 110 and the valve disk 114 spans this passageway 113 and has the restricted short orifice 115. The valve head has the annular flange 116 thereon for receiving the backing disk 117 for the valve disk, this backing disk having the passageway 118 therethrough. A spacer ring 119 within the flange 116 abuts at its inner end the backing disk and at its outer end is engaged by the disk 120 against whose outer side the outer end of the flange 116 is deflected as indicated at 121, this end disk having a number of passageways 122 therethrough. The end disk 120, the backing disk 117 and the spacer ring 119 define the velocity relief chamber 123 into which the fluid flows after passage through the restricted orifice and the velocity energy of the fluid is considerably reduced before the fluid leaves the relief chamber through the passages 122.

During normal pressure conditions the fluid displaced during rebound movement of the vehicle springs flows from the high pressure working compartments of the shock absorber through the passages 43 and 43' and through the short restricted orifice 115 and into the relief chamber 123 from where it flows through the passages 122 into the valve chamber and through the hub passages 44 and 44' into the low pressure working compartments. Under abnormal pressure conditions the valve structure will be moved from its seat against the resistance of the spring 124 so that fluid may flow past the valve seat and through passages 125 provided along the periphery of the valve head, and to the low pressure working compartments. The spring 124 abuts the valve head and is held in axial alignment by the valve head flange 116, the other end of the spring abutting against the bottom of the valve chamber 108.

The entire valve assembly shown on Figure 7 may be inserted into the piston hub from the inner end thereof before the piston structure is assembled in the shock absorber, the spring 124 being dimensioned so that after the seat member 109 has been screwed into position the spring will exert a predetermined pressure against the blow-off valve for resisting opening movement thereof except when predetermined abnormal pressure conditions are reached.

In the arrangement shown on Figure 8 the shaft hub has the valve chamber 126 therein connected by passages 43 and 43' with the high pressure working compartments of the shock absorber, and a cylindrical bore 127 extending from the valve chamber outwardly in the hub, the bore being of less diameter than that in the chamber 126 and the shoulder between the chambers being beveled to provide a valve seat 128. Within the valve chamber is the hollow cylindrical valve head 129 having the beveled shoulder 130 for engaging with the seat 128, the valve head having a hollow plug extension 131 engaging in the bore or chamber 127. Seated in the hollow valve head is a cup-shaped seat member 132 engaging with its bottom against the bottom of the hollow head and having a passageway 133 therethrough. The seating member may be secured by screwing it to the head, the bottom of the seating member forming the inner wall of the hollow plug 131. Within the hollow plug is the valve disk 134 having the short restricted orifice 135 in registration with the passageway 133 through the seating member, and the valve disk is normally held against the bottom of the seating member by a spring 136 within the plug member. The plug member has side passageways 137 connecting the interior thereof with an annular channel 138 in the hub, which channel is in communication with the hub passageways 44 and 44' leading to the low pressure hydraulic working chambers.

Extending across the outer end of the valve chamber 126 is an abutment plate 139 for the inner end of the spring 140 which at its outer end extends into the cup-shaped seating member to abut against the bottom thereof whereby to normally hold the valve head against its seat 128. The abutment plate 139 may be secured by means of an annular key 141.

Under normal pressure conditions the fluid displaced during rebound movement of the vehicle springs will flow from the high pressure hydraulic working chambers through the passages 43—43' into the valve chamber 126 and through the restricted orifice in the valve disk into the hollow plug 131 from where it flows through the passages 137, annular channel 138, and the passages 44 and 44' to the low pressure hydraulic working chambers. Under abnormal pressure conditions the spring 136 will yield for inward axial movement of the orifice valve disk 134 to provide additional passageway for relieving the abnormal pressure, such additional passageway being through the peripheral slots or passages 142 in the valve disk.

During the flow from the high pressure to the low pressure working chambers, the fluid pressure will hold the valve head 129 against the valve seat 128 so that the entire high pressure flow must be through the restricted orifice. During compression movement of the vehicle springs the pressure of the fluid displaced from the low pressure working chambers will shift the valve head structure inwardly against the resistance of the spring 140 to move the valve head from its seat for flow of the fluid into the valve chamber 126 and then through passages 43 and 43' to the high pressure working chambers.

In the various valve assembly arrangements we have described, the relief or blow-off valve structure carries the short restricted orifice which meters the fluid displacement under vehicle spring rebound movement for the desired shock absorber resistance, the orifice automatically compensating for any variation in temperature and viscosity change of the fluid. Under abnormal pressure conditions the blow-off valve structure is moved by the pressure against the resistance of the spring to open up additional passageway for the fluid to thus prevent injury to the shock absorber parts or the connections between the shock absorber and the vehicle parts. The blow-off valve spring is dimensioned to hold the valve closed until a predetermined excess pressure is reached, and on some of the structures disclosed herein provision is made for adjusting the spring tension from the exterior of the shock absorber.

We have shown practical and efficient embodiments of the various features of our invention but we do not desire to be limited to the exact construction, arrangement and operation shown and described as changes and modifications are possible which will still come within the scope and spirit of the invention.

We claim as follows:

1. A valving structure for controlling the fluid flow through a passage between the high pressure working chamber and the low pressure working chamber of a hydraulic shock absorber, said valve structure comprising a blow-off valve and a seat therefor, said valve and seat having aligned axial passageways therethrough for inclusion in said passage, a valve disk carried by the valve and extending across the passageway therethrough and having a short restricted orifice in said passage, and a spring adjusted to hold said valve seated during normal low pressure whereby all the fluid flow will be through said restricted orifice but to yield under abnormal pressure for unseating of the valve to provide a pressure relief passage.

2. A valving assembly for controlling the flow of fluid through a passageway from the high pressure to the low pressure working chambers of a hydraulic shock absorber, said valving assembly comprising a seat member having a bore therethrough and providing an annular seat at one end, a valve for said seat having a bore therethrough in alignment with the seat member bore, a thin metal disk extending across the valve bore and having a short restricted orifice in said bore, said seat member bore and said orifice being included serially in said fluid passageway when said valve is seated and said valve when unseated opening a shunt path around said orifice, and a spring adjusted to hold said valve seated against normal flow pressure but to yield for opening of the valve by the fluid pressure under abnormal pressure conditions.

3. A valve assembly for controlling the flow of fluid through a path from the high pressure to the low pressure working chambers of a hydraulic shock absorber, said valve assembly comprising a tubular seat member having its bore interposed in said path, a valve member movable axially for engagement with or away from the end of said seating member, a guide flange extending from said valve member into engagement with and surrounding said seat member, said valve member having a short restricted metering orifice to which the flow through said path is restricted when the valve engages the seating member, a spring adjusted to hold said valve against the seating member during normal pressure conditions but to yield for movement of said valve away from said seat member to provide a flow path independent of said orifice.

4. A valving structure for controlling the flow of fluid through a path between the high pressure and low pressure working chambers of a hydraulic shock absorber, said valve structure comprising a tubular seat member providing a seat at one end, the bore of said seat member being arranged for inclusion in said fluid flow path, a valve member guided on said seat member for axial movement to seating or unseating position on said seat member, said valve member having a bore therethrough in alignment with the seating member bore and a thin metal disk having a short restricted orifice for restricting flow through said valve bore, and a yielding element for holding said valve seated during normal pressure conditions whereby said orifice alone will meter the flow through said path but permitting unseating of said valve under abnormal pressure conditions for the flow of fluid directly past said seat.

5. A valving structure for controlling the fluid flow in a hydraulic shock absorber having a piston structure with an axial bore connected with the working chambers of the shock absorber, said valving structure comprising a seat member in the bore having a passageway concentric with the bore and providing a valve seat, a valve member concentric with said bore and movable axially therein to seating or unseating position, said valve member having a short restricted metering orifice in alignment with the seating member passage, a spring coaxially arranged in said bore and having one end abutting said valve, an abutment head for the other end of said spring guided in said bore, an adjusting member movable in said bore for engagement with said abutment head to adjust the pressure of said spring against said valve, said spring holding said valve seated under normal pressure conditions for control of the fluid flow solely by said restricted orifice but said spring yielding under abnormal pressure conditions for unseating of the valve and additional flow between the seat member and valve.

6. A valving structure for controlling the fluid flow in a hydraulic shock absorber having a piston structure with an axial bore connected with the working chambers of the shock absorber, said valving structure comprising a seat member in the bore having a passageway concentric with the bore and providing a valve seat, a valve member concentric with said bore and movable axially therein to seating or unseating position, said valve member having a short restricted metering orifice in alignment with the seating member passage, a spring coaxially arranged in said bore and having one end abutting said valve, an abutment head for the other end of said spring guided in said bore, an adjusting member movable in said bore for engagement with said abutment head to adjust the pressure of said spring against said valve, said spring holding said valve seated under normal pressure conditions for control of the fluid flow solely by said restricted orifice but said spring yielding under abnormal pressure conditions for unseating of the valve and additional flow between the seat member and valve, said valve member and said spring abutment head having telescopic interconnection.

7. A valving assembly for controlling the hydraulic flow in a hydraulic shock absorber comprising an annular seat member, a valve member comprising a thin disk having a short restricted metering orifice co-axial with said seat member, a spring having abutting engagement at one end with said valve member, an adjustable abutment head for the other end of said spring for adjusting the spring pressure against said valve, said valve and abutment head having telescopic guiding interconnection, said spring being adjusted to hold said valve seated under normal pressure conditions whereby the fluid flow will be restricted to said orifice but said spring yielding under abnormal pressure conditions for unseating of said valve by the fluid pressure and opening of additional fluid path independently of said orifice.

8. A valving assembly for controlling the fluid flow in a hydraulic shock absorber comprising a seat member having a passageway therethrough, a valve member having a passageway therethrough forming a continuation of said seat member passageway when the valve is seated, said valve member comprising a thin disk having a short restricted orifice included in said passageway and a velocity energy dissipating chamber for receiving the fluid flow through said orifice, and a spring adjusted to hold said valve seated under normal pressure conditions for the flow of all of the displaced fluid through said valve passageway under control of said orifice but said spring yielding for unseating of said valve under abnormal pressure conditions for additional flow of fluid between the seating member and valve.

9. A valving structure for controlling the flow of displaced fluid in hydraulic shock absorbers comprising a seat member and a valve member in axial alignment and having passageways therethrough forming a continuous path for the flow of fluid when the valve is seated, a thin disk having a restricted orifice interposed in said valve passage, and a spring adjusted to hold the valve seated under normal pressure conditions whereby all the fluid flow is through said orifice, said spring yielding under abnormal pressure conditions for unseating of the valve and flow through said seat passage independently of said valve passage.

10. A valving assembly for controlling the fluid through a passage between the high pressure and low pressure working chambers of a hydraulic shock absorber, said valve assembly comprising a blow-off valve structure having an axial bore therethrough for inclusion in said passage, a seat structure for said blow-off valve structure and a spring tending to hold said blow-off valve structure seated, a valve within said blow-off valve structure and a seat therefor, said valve arranged when seated to restrict the flow through said blow-off valve structure bore and to relieve the flow when unseated, and a spring within the blow-off valve structure tending to hold said valve therein seated, the arrangement being such that said blow-off valve structure will be unseated by abnormal pressure of fluid flow through said passage in one direction and said valve within said blow-off valve structure will be unseated by abnormal pressure of fluid flow in the opposite direction to said passage.

11. A valving structure for controlling the fluid flow in a hydraulic shock absorber having a piston structure with an axial bore connected with the working chambers of the shock absorbers, said valving structure comprising a seat member mounted in said bore and providing an annular valve seat, a valve member concentric with said seat and fitting said piston structure bore to be guided therein for axial movement and for cooperation with said annular seat, said valve member having a short restricted metering orifice in alignment with the seat member passageway, a spring arranged in said bore and having one end abutting said valve member, said spring holding said valve seated under normal pressure conditions for control of fluid flow solely by the restricted orifice, but said spring yielding under abnormal pressure conditions for unseating of the valve and additional flow between the seat member and valve member.

RALPH F. PEO.
CARL F. LAUTZ.
GERVASE M. MAGRUM.